Sept. 30, 1941. E. E. HEWITT Re. 21,912
SANDING CONTROL MEANS
Original Filed Dec. 30, 1939
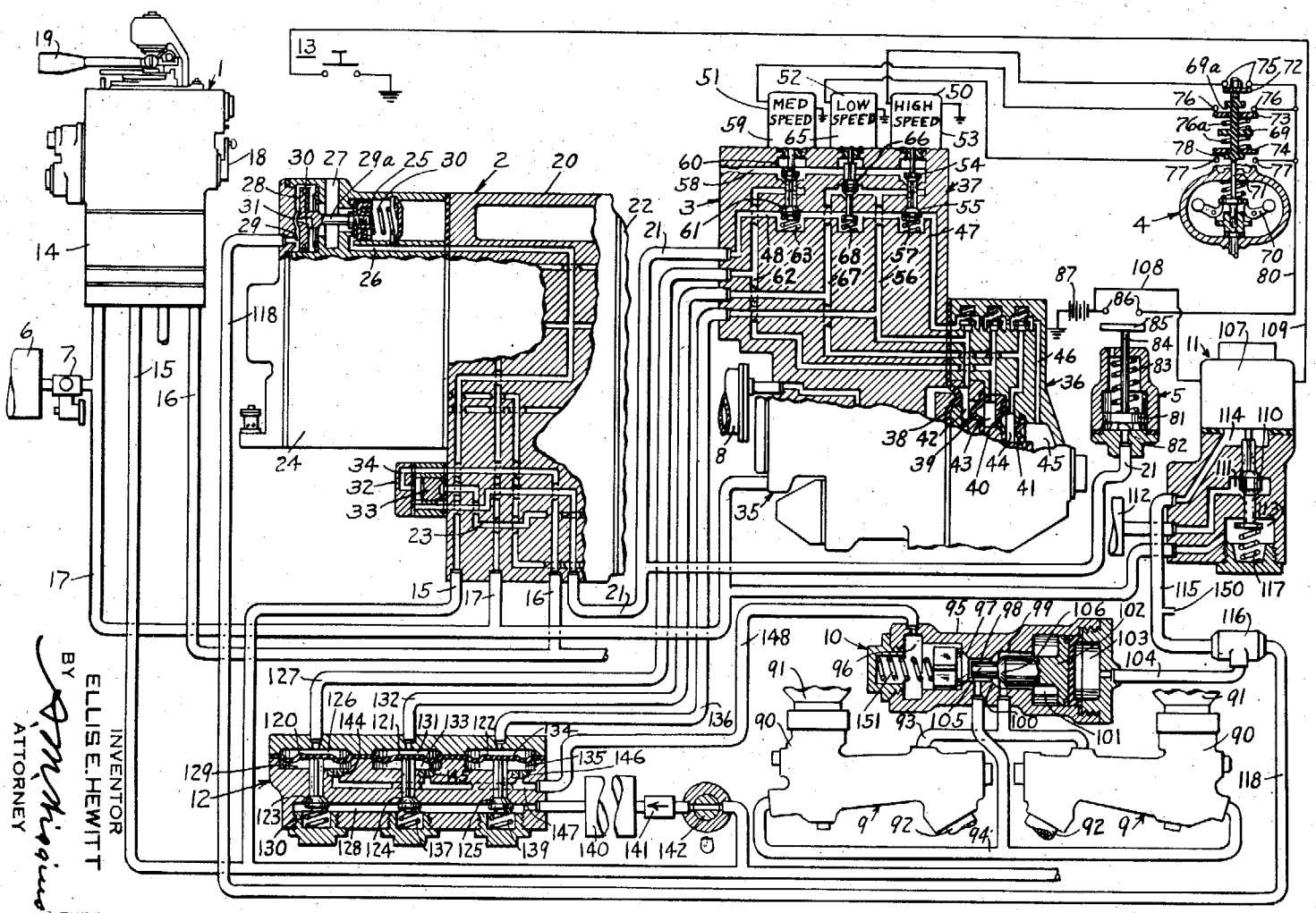
INVENTOR
ELLIS E. HEWITT
BY A. M. Higgins
ATTORNEY Reissued Sept. 30, 1941

Re. 21,912

UNITED STATES PATENT OFFICE 21,912

SANDING CONTROL MEANS

Ellis E. Hewitt, Edgewood, Pa., assignor to The Westinghouse Air Brake Company, Wilmerding, Pa., a corporation of Pennsylvania Original No. 2,232,915, dated February 25, 1941, Serial No. 311,920, December 30, 1939. Application for reissue April 30, 1941, Serial No. 391,160

17 Claims. (Cl. 291—3)

This invention relates to sanding apparatus and more particularly to the type for use on railway vehicles for sanding track rails.

In the modern high speed railway trains greater and faster acting braking forces are required on the vehicle wheels than heretofore employed in order to decelerate or stop the trains in the relatively short distances necessary to meet operating schedules and to insure the safety of the trains. In order to minimize slipping or sliding of the wheels when the brakes are thus applied sand is usually applied to the rails to increase the friction between the wheels and rails.

Sanding arrangements heretofore used on railway trains have been so designed as to provide a substantiallly uniform rate of flow of sand for sanding the rails. The same amount of sand has thus been provided for sanding the rails when the train is operating at high speed as when operating at lower speeds. It has therefore been necessary to design these arrangements to insure an adequate amount of sand on the rails for the maximum speed of the train with the obvious result that an excessive amount of sand is applied to the rails at all lower speeds. This naturally results in the wasting of sand at the lower speeds and has required larger amounts of sand being carried on trains than would have otherwise been required.

One object of the present invention is to provide an improved sanding arrangement for railway vehicles or trains adapted to minimize waste of sand such as just described, but which will insure an adequate supply of sand to the track rails at all train speeds to provide most efficient braking of the train under all conditions.

Another object of the invention is to provide an improved sanding apparatus for use on railway vehicles or trains which is so arranged as to provide an amount of sand for sanding purposes which varies substantially according to the speed at which the train or vehicle is operating.

The present invention is particularly adapted for use on railway vehicles provided with brake equipment of the type controlled by a speed governor device which operates in accordance with the speed of the vehicle to provide different degrees of braking effort for different ranges of speed in order to minimize the possibility of slipping or sliding of the wheels on the train or vehicle.

A more specific object of the invention is therefore to provide an improved sanding apparatus for a railway vehicle adapted to operate in accordance with the operation of a speed governor device, such as just described, to provide different amounts of sand for sanding the track rail for the different speed ranges of the train or vehicle, that is, to provide a relatively large amount of sand for sanding when the train or vehicle is operating in a relatively high speed range, and proportionately less amounts of sand for sanding when operating in lower speed ranges.

Other objects and advantages will be apparent from the following more detailed description of the invention.

In the accompanying drawing, the single figure is a diagrammatic view, partly in section and partly in outline, of a combined fluid pressure brake equipment and improved sanding arrangement constructed in accordance with the invention.

*Description*

As shown in the drawing, the fluid pressure brake equipment employed for illustrating one application of the invention comprises an engineer's brake valve device 1, a fluid pressure controlled brake controlling valve device 2, a differential relay valve device 3, a speed governor device 4, a pneumatic switch device 5, a main reservoir 6, a feed valve device 7 and a brake cylinder device 8. The improved sanding arrangement comprises one or more rail sanders 9, a sanding valve device 10, and electro-magnet valve device 11, a fluid pressure supply control valve device 12, and a manually operative self-opening electric switch 13 which is disposed adjacent the brake valve device 1 for operation by the engineer.

The engineer's brake valve device 1 is preferably of the combined automatic and self-lapping straight air type disclosed in Patent 2,106,483 issued to me on January 25, 1938, and comprises a casing 14 to which there are connected a brake pipe 15, a straight air pipe 16 and a fluid pressure supply pipe 17. The pipe 17 is connected to the feed valve device 7 which is adapted to operate in the usual manner to supply fluid at a desired reduced pressure to said pipe from the main reservoir 6 which may be supplied with fluid under pressure in any desired manner.

On one side of casing 14 there is provided a selector handle 18 which is movable to either one or another of two positions for selecting whether the brakes of the vehicle will be controlled automatically through the brake pipe 15 or by straight air through the straight air pipe 16. A handle 19 is provided for the engineer to operate the brake valve device to control the brakes on the vehicle in accordance with the position of the selector handle 18.

The brake controlling valve device 2 may be of any desired type which is adapted to operate upon a reduction in pressure in brake pipe 15 to effect an application of brakes on the vehicle and upon an increase in said pressure to effect a release of brakes on the vehicle. However, for the purpose of illustration, it is shown as of the type disclosed in Patent 2,152,257 issued to me and Donald L. McNeal on March 28, 1939, but only those parts are shown which are required to illustrate the present invention.

As shown, the brake controlling valve device 2 comprises a pipe bracket 20 to one face of which is connected the brake pipe 15, fluid pressure supply pipe 17, straight air pipe 16 and a brake application and release pipe 21 leading to the differential relay valve device 3 and pneumatic switch device 5.

On another face of the pipe bracket 20 there is mounted a service application portion 22, only a portion of which is shown, and which is adapted to operate upon a service reduction in pressure in brake pipe 15 to supply fluid under pressure to a passage 23 for effecting a service application of the brakes on the vehicle and which is adapted to operate upon an increase in pressure in the brake pipe to release fluid under pressure from said passage to effect a release of the brakes.

On another face of pipe bracket 20 there is mounted an emergency valve portion 24 which is adapted to operate together with the service application portion 22 upon an emergency reduction in brake pipe pressure to supply fluid under pressure to passage 23 for effecting an emergency application of the brakes on the vehicle.

Associated with the emergency valve device 24 is a brake pipe vent valve device comprising a vent valve 25 for controlling an emergency communication between a passage 26, and thereby the brake pipe 15 to which said passage is connected, and an atmospheric vent 27 through which, when said valve is open, an emergency venting of fluid under pressure from the brake pipe is adapted to be effected in the usual manner. The vent valve device further comprises a piston 28 connected by a stem 29*a* to the vent valve 25 and which is adapted to be operated by fluid under pressure supplied to a chamber 29 at one side of said piston for opening said vent valve against the pressure of a spring 30. The fluid under pressure for operating the vent valve piston 28 is adapted to be obtained from the emergency valve device 24 upon the usual emergency operation thereof and such pressure is adapted to be dissipated through a choke 31 provided in said piston and connecting chamber 29 to the vent passage 27. The spring 30 is provided for closing the vent valve 25.

Preferably associated with the pipe bracket 20 of the brake controlling valve device is a double check valve device 32 comprising a double check valve 33 which is arranged to operate in the usual manner to control communication between the brake application and release pipe 21 and a passage 34 connected to the straight air pipe 16 on the one hand, and the passage 23 through which the brakes on the vehicle are adapted to be controlled by automatic operation of the brake controlling valve device 2 on the other hand.

Briefly, the operation of the brake valve device 1 and brake controlling valve device 2 is as follows.

When the selector handle 18 on the engineer's brake valve device 1 is in the straight air position and the brake valve handle 19 is operated to effect a straight air application of the brakes, fluid under pressure is adapted to be supplied to the straight air pipe 16 from which it will flow by passage 34 to one end of the double check valve 33 and shift said check valve to the position shown in the drawing. With the check valve 33 in this position fluid under pressure supplied to passage 34 is adapted to flow to the application and release pipe 21 for effecting a straight air application of brakes on the vehicle as will hereinafter be more fully described. Upon subsequent operation of the brake valve device 1 to effect a release of the brakes, fluid under pressure will be vented from the brake application and release pipe 21 by way of the straight air pipe 16, as will be apparent.

If it is desired that the brakes on the vehicle be controlled automatically, the selector handle 18 is turned to the automatic position. When the brake valve handle 19 is then operated to effect an application of the brakes on the vehicle the pressure in brake pipe 15 is reduced. The brake controlling valve device 2 then operates in accordance with whether the reduction in brake pipe pressure is at a service rate or an emergency rate to supply fluid under pressure to the automatic application passage 23 of the pipe bracket 20. This supply of fluid under pressure to passage 23 is adapted to shift the double check valve 33 from the position shown to its left-hand position to close communication between pipe 21 and the straight air pipe passage 34. Fluid supplied to passage 23 is then adapted to flow to pipe 21 for applying the brakes on the vehicle.

When the brake controlling valve device 2 operates upon an emergency reduction in brake pipe pressure as just described, it is also adapted to supply fluid under pressure to the vent valve piston chamber 29 for operating piston 28 to unseat the vent valve 25 so as to locally vent fluid under pressure from the brake pipe 15 to the atmosphere through the vent port 27 at an emergency rate for propagating the emergency reduction in brake pipe pressure to the next car in the train, in the usual well known manner. Also, as well known, the supply of fluid under pressure to piston chamber 29 for operating the piston 28 to unseat the vent valve 25 is limited and will be gradually dissipated to the atmosphere through vent port 30 in said piston. The capacity of this vent port is however so related to the amount of fluid pressure supply as to maintain the vent valve 25 unseated sufficiently long to insure substantially complete venting of fluid from the brake pipe at which time the spring 30 is adapted to act to seat the vent valve 25.

When the brake valve handle 19 is operated to effect an increase in pressure in the brake pipe 15, for releasing the brakes on the vehicle, subsequent to either a service or emergency application of brakes, the brake controlling valve device will respond and operate to release fluid under pressure from the automatic application and release passage 23 and thereby from the brake application and release pipe 21.

Thus it will be evident that regardless of whether the brakes on the vehicle are controlled by straight air through the straight air pipe 16 or automatically by operation of the brake controlling valve device 2, such control is effected by way of the application and release pipe 21.

A further description of the construction and operation of the brake valve device 1 and brake controlling valve device 2 is not deemed essential to a comprehensive understanding of the invention.

The differential relay valve device 3 employed to illustrate a use of the invention may be similar to that disclosed in Patent 2,140,624 issued to me on December 20, 1938, and which is adapted to operate upon the supply of fluid under pressure to the application and release pipe 21 to supply fluid to the brake cylinder device 8 and to vary the pressure obtained in said brake cylinder device in accordance with the speed at which the vehicle is operating as governed by the speed governor device 4.

The differential relay valve device comprises a self-lapping application and release valve portion 35, a diaphragm portion 36 and a magnet portion 37.

The self-lapping application and release valve portion 35, the details of which are not shown in the drawing, is adapted to operate in accordance with the degree of force applied thereto by the diaphragm portion 36 to supply fluid under pressure from the supply pipe 17 to the brake cylinder device 8 and to release fluid under pressure from said device as required to maintain the pressure in said brake cylinder device in proportion to the degree of said force.

The diaphragm portion 36 comprises four flexible diaphragms 38, 39, 40 and 41 which are coaxially arranged in spaced relation and operatively connected to the application and release valve portion 35. These diaphragms are of different effective areas stepped down in size in the order named. An operating chamber 42 is provided between the diaphragms 38 and 39, an operating chamber 43 is provided between the diaphragms 39 and 40, an operating chamber 44 is provided betwen the diaphragms 40 and 41, while at the outer face of the smallest diaphragm 41 there is provided a chamber 45 which is in permanent communication with the application and release pipe 21, by way of passages 46, 47 and 48.

The magnet portion 37 of the relay valve device comprises a high speed electro-magnet valve device 50, a medium speed electro-magnet valve device 51 and a low speed electro-magnet valve device 52.

The high speed electro-magnet valve device 50 comprises a magnet 53 and a pair of oppositely seating valves 54 and 55; said magnet being operative upon energization to seat the valve 54 and to unseat the valve 55 for opening communication between the application and the release pipe passage 48 and a passage 56 which leads to diaphragm chamber 42. A spring 57 is provided to act, upon deenergization of magnet 53 to seat valve 55 and to unseat valve 54 for connecting passage 56 with an atmospheric vent passage 58.

The medium speed electro-magnet valve device 51 comprises a magnet 59 and a pair of oppositely seating valves 60 and 61. This magnet is operative upon energization to seat the valve 60 and to unseat valve 61 for supplying fluid under pressure from the application and release pipe passage 48 to a passage 62 leading to diaphragm chamber 43. A spring 63 is provided to seat valve 61 and to unseat valve 60 upon deenergization of magnet 59 for connecting passage 62 with the vent passage 58.

The low speed electro-magnet valve device 52 comprises a magnet 65 and a double beat valve 66 adapted upon energization of said magnet to connect a passage 67 to the vent passage 58. A spring 68 is provided to act upon deenergization of magnet 65 to move the valve 66 to a position for connecting the application and release pipe passage 48 to the passage 67 leading to the diaphragm chamber 44.

The speed governor device comprises a centrifuge 70 adapted to be rotated from and at a speed proportional to that of any suitable part of a vehicle, such as an axle or wheel (not shown). A vertically movable shaft 71 is provided for control by centrifuge 70 and is adapted to be moved thereby to various vertical positions, dependent upon the speed at which the vehicle is operating.

The shaft 71 carries three movable contact fingers 72, 73 and 74 for engagement respectively with three sets of fixed contact fingers 75, 76 and 77. The movable contact 72 is fixed for movement with the shaft 71. The contacts 73 and 74 are slidably mounted on the shaft 71 at either side of a collar 69 fixed to said shaft and between said collar and each of said contacts there is disposed a spring 76*a*. A collar 69*a* is fixed on the shaft 71 at the opposite side of and for engaging the contact 73 to move same out of engagement with the fingers 76 upon downward movement of shaft 71, while a collar 78 is fixed on said shaft below the contact 74 for engaging same to lift it out of contact with fingers 77 upon movement of shaft 71 in an upwardly direction.

All of the parts just described are so arranged that above a certain high speed limit of the vehicle the contacts 72 and 73 will electrically connect fingers 75 and 76, respectively, as shown in the drawing. The shaft 71 is adapted to move downwardly upon a reduction in vehicle speed and to move the contact 72 out of engagement with the fingers 75 at the time the speed of the vehicle reduces below the high speed limit, just mentioned. The contact 73 is adapted to maintain engagement with the fingers 76 until the shaft 71 obtains a position corresponding to a medium speed limit of the vehicle. Further downward movement of the shaft 74 is then adapted to pull the contact 73 out of engagement with the finger 76. When the shaft 71 obtains a still lower position, corresponding to a low speed limit of the vehicle, the contact 74 is adapted to engage fingers 77 and such engagement is then adapted to be maintained for all further reduction in the speed of the vehicle. Upon an increase in vehicle speed the operation of the governor contacts 74, 73 and 72 will be just the reverse of that obtained upon a reduction in vehicle speed, as will be apparent.

The stationary contact fingers 75, 76 and 77 at one side of the shaft 71 are all connected to a common wire 80, while at the other side of said shaft the fingers are connected respectively to the high speed magnet 53, the medium speed magnet 59 and the low speed magnet 65.

The pneumatic switch device 5 comprises a casing containing a piston 81 having at one side a chamber 82 connected to the application and release pipe 21, while at the opposite side of said piston there is provided a spring 83 for urging said piston in the direction of said chamber. The piston 81 is provided with a stem 84 on the outer end of which a contact 85 is arranged for movement into circuit closing relation with a pair of fixed contacts 86 one of which is connected to the wire 80 while the other is connected to one terminal of a battery 87 the other terminal of which is grounded.

The rail sanders 9 may be of any conventional type from which sand is adapted to be blown by fluid under pressure to an outlet for supply to the track rails; one sander 9 being provided for each of the rails under a vehicle. As shown in the drawing, each of the rail sanders 9 comprises a casing 90 having at one end adjacent the top thereof a sand inlet connection with a sand box 91 from which sand is adapted to flow by gravity into the sander. At the opposite end of the casing 90 and adjacent the bottom thereof there is provided an outlet to a pipe 92 through which sand is adapted to be conveyed by gravity to the track rail.

A cleaning pipe 93 and a pipe 94 are connected to the casing 90 of each of the rail sanders, it being noted that said sanders are shown in the drawing connected in parallel. The cleaning pipe 93 is provided for conveying fluid under pressure directly into the sanders for cleaning same while the pipe 94 is provided for conveying fluid under pressure to the sanders for blowing sand, supplied thereto from the sand boxes 91, to the sand outlet pipes 92, the amount of sand thus supplied to said outlet pipes depending upon the amount or pressure of fluid supplied to the sanders by way of the pipe 94.

The sanding valve device 10 is provided for controlling the supply of fluid under pressure to the pipes 93 and 94 and comprises a casing 95 having a chamber 96 containing a valve 97 which is arranged to control communication between said chamber and a bore 98 to which pipe 94 is open. The end of bore 98 opposite the valve 97 opens to a coaxial bore 99 of greater diameter and which is open to the cleaning pipe 93. A valve seat 100 is provided connecting the adjacent ends of bores 98 and 99. The opposite end of bore 99 is open to a chamber 101 which contains a piston 102 having at its outer face a pressure chamber 103 which is connected to a pipe 104. Projecting from the opposite face of piston 102 through chamber 101 and bores 99 and 98 into substantial engagement with valve 97 is an operating stem 105. This stem has a loose fit in the bore 99 for supporting same and is provided with a valve 106 for engagement with the valve seat 100. Beyond this valve the portion of stem 102 extending into the bore 98 is of smaller diameter than said bore to permit the flow of fluid under pressure therethrough.

The operation of the sanding valve device is adapted to be controlled by either the electro-magnet valve device 11 or by the emergency valve portion 24 of the brake controlling valve device 2.

The electro-magnet valve device 11 comprises a magnet 107 having one terminal connected to the ungrounded side of battery 87 through a wire 108 and the other terminal connected to a wire 109 which leads to one finger of the manually operated switch 13 the other finger of which is grounded. The electro-magnet valve device 11 further comprises a double beat valve 110 contained in a chamber 111 which is connected to a sand reservoir 112. The double beat valve 110 is provided for controlling communication between the chamber 111 and a chamber 113 which is connected to the fluid pressure supply pipe 17, and chamber 111 and a chamber 114 which is connected to a pipe 115 leading to one end of a double check valve device 116. A spring 117 is provided in chamber 113 for urging the valve 110 to the position shown in the drawing for opening communication between the fluid pressure supply pipe 17 and sand reservoir 112 when the electro-magnet 107 is deenergized. When the electro-magnet 107 is energized it is adapted to move the valve 110 to a position opposite from that shown for closing communication between the supply pipe 17 and sand reservoir 112 and for connecting said reservoir to the pipe 115 leading to the double check valve 116.

A pipe 118 connects the opposite end of the double check valve device 116 to the vent valve piston chamber 29. The side outlet of the double check valve device 116 is connected to the pipe 104 leading to piston chamber 103 of the sanding valve device 10. The double check valve device 116 is operative in the usual manner to close communication between pipes 118 and 104 when fluid under pressure is supplied to pipe 115 for supply to pipe 104 and to close communication between pipes 115 and 104 when fluid under pressure is supplied to pipe 118 for supply to pipe 104.

The control valve device 12 comprises three flexible diaphragms 120, 121 and 122 and three poppet valves 123, 124, and 125; the valve 123 being arranged for control by diaphragm 120, the valve 124 by diaphragm 121 and the valve 125 by the diaphragm 122. The diaphragm 120 has at one side a chamber 126 connected to a fluid pressure supply pipe 127 and is operative upon the supply of fluid under pressure to said chamber to unseat the valve 123 for opening communication from a fluid pressure supply passage 128 to a chamber 129 provided at the opposite side of the diaphragm. A spring 130 is provided for urging the valve 123 to its seat.

The diaphragm 121 has at one side a chamber 131 connected to a fluid pressure supply pipe 132 and is adapted to operate upon the supply of fluid under pressure to said chamber to unseat the valve 124 for opening communication between passage 128 and a chamber 133 provided at the opposite side of said diaphragm. The diaphragm 122 has at one side a pressure chamber 134 connected to a control pipe 136 and is adapted to operate upon the supply of fluid under pressure to said chamber to unseat the valve 125 for opening communication between the fluid pressure supply passage 128 and a chamber 135 provided at the opposite side of the diaphragm. A spring 137 is provided for urging the valve 124 to its seated position shown, while a spring 139 is provided by urging the valve 125 to its seated position shown.

The supply passage 128 is connected to a fluid pressure supply reservoir 140 which is connected by way of a check valve 141 and a hand operated cut-out valve 142 to the brake pipe 15. It will be evident that when the brake pipe 15 is charged with fluid under pressure in the usual manner, fluid will flow therefrom to the reservoir 140 and charge same to substantially the same pressure, and fluid at such pressure will be supplied to passage 128 in the valve device 12.

The diaphragm chambers 129, 133, and 135 are connected, respectively, through chokes 144, 145, and 146 to a passage 147 which is connected to one end of a pipe 148 the opposite end of which is connected to chamber 96 in the sanding valve device 10.

The control pipes 127, 132, and 136 are connected to passages 62, 67, and 56 leading to the medium, low and high speed magnet valve devices, respectively, in the differential relay valve device 3. By this arrangement it will be noted that the chambers 126, 131, and 134 are connected in parallel with the chambers 43, 44, and 42, respectively, in the relay valve device 3.

*Operation of the brake equipment*

If it is desired to effect an application of the brakes on the vehicle, fluid under pressure is supplied to the brake application and release pipe 21 either by straight-air operation of the brake valve device 1 or by automatic operation of said brake valve device and the consequent operation of the brake controlling valve device 2, as hereinbefore described. When a relatively low pressure is thus obtained in pipe 21 such pressure acting in chamber 82 on piston 81 of the switch device 5 actuates said piston to move the contact 85 into circuit closing relation with the contact fingers 86 for thereby connecting the battery 87 to wire 80 leading to one of each pair of fixed contact fingers in the speed governor device 4.

Let it be assumed that the vehicle is operating above the high speed limit, in which case the movable governor contacts will occupy the positions shown so that electric current supplied through wire 80 will be thus supplied to the high speed magnet 53 and to the medium speed magnet 59, for energizing said magnets. The low speed magnet 52 remains deenergized under this condition. The high and medium speed magnet valves 54 and 60 are thus seated while the valves 55 and 61 are unseated.

Fluid under pressure supplied to the pipe 21 as above described then flows directly to diaphragm chamber 45 and with the magnet controlled valves conditioned as just described, fluid under pressure will also flow from pipe 21 through passage 48 past the valve 55 to passage 56 leading to diaphragm chamber 42 and also past the magnet valve 61 to passage 62 leading to diaphragm chamber 43. Fluid under pressure will also flow from passage 48 past the low speed magnet valve 66 to passage 67 leading to chamber 44. Under this speed condition the chambers 42 to 45 will be thus all charged with fluid at the same pressure upon initiating an application of brakes on the vehicle so that the three smaller diaphragms 39, 40, and 41 will be in a balanced condition. The pressure in chamber 42 acting on the largest diaphragm 38 is not balanced however as just described and is therefore adapted to exert a force acting in the direction of the left hand to control the operation of the application and release valve device 35 for supplying fluid under pressure to the brake cylinder device 8 to apply the brakes on the vehicle. The degree with which the brakes on the vehicle will be applied as just described is controlled by the relatively large effective area of diaphragm 38 and the degree of fluid pressure supplied to act in chamber 42. The pressure of fluid supplied to chamber 42 by operation of either the brake valve device or brake controlling valve device 2 may be of any degree desired to provide for a chosen degree of braking on the vehicle and consequently a desired rate of deceleration thereof, as will be apparent.

When, due to the brake application just described, the speed of the vehicle becomes reduced to below the high speed limit the contact 72 in the governor device 4 is moved out of engagement with the fingers 75 and thereby effects deenergization of the high speed magnet 53 as a result of which spring 57 seats valve 55 and unseats valve 54. The unseating of valve 54 opens communication between diaphragm chamber 42 and the atmospheric release passage 58 thereby releasing the fluid under pressure from said chamber. This permits the pressure of fluid acting in diaphragm chamber 43 on the effective area of diaphragm 39 to control the operation of the application of the release valve device 35, and since the effective area of the diaphragm 39 is less than that of the larger diaphragm 38, the force acting on the application and release valve device is likewise less and said device operates to effect a corresponding reduction in pressure in the brake cylinder 8 and in the degree of brake application.

When the speed of the vehicle becomes reduced to below the medium speed limit the contact 73 in the speed governor device is moved out of engagement with the contact fingers 76 and thereby effects deenergization of the medium speed magnet 59. Spring 63 then acts to seat valve 61 and unseat valve 60, due to which, fluid under pressure is vented from the diaphragm chamber 43 through passage 62 past valve 60 to the release passage 58 and then to the atmosphere. As a result, the diaphragm 39 is rendered ineffective to further control the degree of brake application on the vehicle and the diaphragm 40 of smaller effective area comes into control, and since this area is less than that of diaphragm 39 the force controlling operation of the application and release valve device 35 is reduced a corresponding amount. As a result the brake cylinder pressure is correspondingly reduced and the degree of brake application limited to the lower speed.

When the speed of the vehicle becomes reduced to the low speed limit, the speed governor device 4 moves the contact 74 into circuit closing relation with the contact fingers 77 and thereby supplies electric current from wire 80 to the low speed magnet 65 which is thereby energized and operates to move the double beat valve 66 to its lower seated position. In this position of valve 66, diaphragm chamber 44 is vented to the atmosphere through passage 67 to the release passage 58 so that the flexible diaphragm 40 is rendered ineffective to further control the operation of the application and the release valve device 35, said control being passed on to the smallest diaphragm 41, and since the area of this diaphragm is less than that of diaphragm 40, the application and release valve device operates to correspondingly reduce the pressure of fluid in the brake cylinder device. This degree of brake application is then retained for all further reduction of vehicle speed since the governor contact 74 will remain in bridging relation with the contact fingers 76.

If at the time the brake application is initiated on the vehicle the vehicle is operating below the high speed limit the high speed magnet 53 will remain in its deenergized condition so that the largest diaphragm 38 will never be effective during that brake application to control the degree of brake application. Instead, the diaphragm 39 will be initially effective under this condition and the diaphragms 40 and 41 will successively come into control as the vehicle speed is reduced to correspondingly reduce the degree of the brake application in the same manner as above described. If at the time the brake application is initiated the train is operating at a speed between the low and medium speed limits, the high and medium speed magnets will not be energized in which case neither of the diaphragms 38 nor 39 will be effective to control the degree of brake application. Under this condition the diaphragm 40 will be initially effective followed by the diaphragm 41 at the time the speed of the vehicle is reduced to below the low speed limit. In case the brake application is initiated when the vehicle is operating below the low speed limit then, as will be apparent, the diaphragms 38, 39, and 40 will not come into action and diaphragm 41 will control the degree of brake application.

It should be noted that all of the diaphragm chambers 42 to 45 are supplied with fluid under pressure whenever the brakes on the vehicle are applied with the vehicle operating above the high speed limit. When the brakes on the vehicle are applied with the vehicle operating between the high and medium speed limits the diaphragm chamber 42 is vented, while the chambers 43 to 45 are all supplied with fluid under pressure. When the vehicle is operating at a speed between the medium and low speed limit both of the diaphragm chambers 42 and 43 are vented while the chambers 44 and 45 are supplied with fluid under pressure. Below the low speed limit only chamber 45 is supplied with fluid under pressure, as will be apparent. Advantage is taken of this variable pressure condition of chambers 42, 43 and 44 for controlling the operation of the improved sanding mechanism to vary the supply of sand for sanding the track rails, as will now be described.

*Operation of the sanding apparatus*

It will be noted that since diaphragm chambers 134, 126, and 131 in the fluid pressure supply control valve device 12 are connected to the diaphragm chambers 42, 43, and 44, respectively, in the relay valve device 3, as hereinbefore described, all of said diaphragm chambers in the control valve device 12 will be supplied with fluid under pressure whenever the brakes on the vehicle are applied with the vehicle operating at or above the high speed limit. When the vehicle is operating between the high and medium speed limits at the time the brakes thereon are applied and the diaphragm chamber 42 in the differential relay device 3 is vented, the diaphragm chamber 134 in the valve device 12 will likewise be vented. With the vehicle operating between the medium and low speed limits at the time the brakes are applied and the chambers 42 and 43 in the differential relay valve device thus vented, the chambers 134 and 126 in the valve device 12 will also be vented. When a vehicle is operating below the low speed limit all of the diaphragm chambers 134, 126, and 131 in the valve device 12 will be vented along with the diaphragm chambers 42 to 44, respectively, in the valve 12.

When fluid under pressure is supplied to all of the diaphragm chambers 134, 126, and 131 in the valve device 12, such pressure acting on the diaphragms 122, 120, and 121 deflects said diaphragms in a downwardly direction and unseats the valves 125, 123, and 124 which then supply fluid under pressure from passage 128 to chambers 135, 129 and 133, respectively. The fluid under pressure thus supplied to chambers 135, 129, and 133 then flows through the chokes 146, 144, and 145, respectively, to passage 147 and then to pipe 148 leading to the sanding valve device 10. With the vehicle operating above the high speed limit the amount of fluid under pressure thus supplied to pipe 148 for sanding purposes, which will be described in greater detail hereinafter, is therefore governed by the combined flow capacities of chokes 146, 144 and 145.

With the vehicle operating between the high and medium speed limits, in which case the diaphragm chamber 122 is vented as above described, the valve 125 will be seated by spring 139, so that there can be no supply of fluid under pressure for sanding through the choke 146 to the pipe 148. Under this speed condition it will thus be apparent that the supply of fluid under pressure to pipe 148 for sanding is limited to the combined flow capacities of chokes 144 and 145.

With the vehicle operating between the medium and low speed limits and both diaphragm chambers 134 and 126 vented, both of the valves 125 and 123 will be seated. Under this condition the supply of air to pipe 148 for sanding purposes is thus limited to the flow capacity of choke 145 only.

When the vehicle is operating below the low speed limit all of the diaphragm chambers 134, 126, and 131 are vented along with diaphragm chambers 42 to 44 of the relay valve device and as a result all of the valves 125, 123 and 124 in the valve device 12 will be seated so that no fluid pressure is supplied to pipe 148 for sanding.

It will now be apparent that whenever the brakes on the vehicle are applied fluid under pressure will be supplied to the pipe 148 for sanding, which will presently be described, in an amount or at a pressure which depends upon the number of chokes 146, 145 and 144 which are rendered effective as governed by the speed at which the vehicle is operating.

Whenever the brakes on the vehicle are applied with the vehicle operating above the low speed limit the operator may effect sanding of the track rails by closing the switch 13 to effect energization of the magnet 107. The energization of this magnet acts to shift the double beat valve 110 to the opposite position from that shown in the drawing and to thereby connect the sanding reservoir 112, which was previously charged with fluid under pressure from the supply pipe 17, to pipe 115 leading to one end of the double check valve device 116. The double check valve is thereby operated to close communication between pipe 118 and pipe 104 and to connect the latter to pipe 115. Fluid pressure supplied to pipe 115 then flows to pipe 104 and thence to piston chamber 103 in the sanding valve device 10.

This supply of fluid under pressure to piston chamber 103 acts to move said piston and thereby the valve 106 in the direction of the left hand to unseat the valve 97 to permit fluid under pressure supplied to the pipe 148 by the valve device 12 to flow past the valve 97 to the bore 98. After the valve 97 is thus unseated the continued movement of piston 102 moves the valve 106 into engagement with seat 100 to close communication between bore 98 and the bore 99. It will thus be apparent that during this operation, the valve 106 will be unseated momentarily after valve 97 is unseated so that, for an instant, fluid under pressure supplied from pipe 148 to bore 98 will be permitted to flow to the bore 99 and then to the cleaning pipe 93 for supply to the rail sanders to clean same. This supply of fluid to the cleaning pipe 93 is however only momentary since the valve 106 is promptly moved into engagement with the seat 100 to cut off such flow so that all further fluid supplied to the bore 98 will flow through the sanding pipe 94 to the rail sanders 9 for blowing sand from said sanders to the outlet pipes 92 for supply to the track rails for sanding same.

The amount of pressure of fluid supplied from pipe 148 through the sand pipe 94 to the two rail sanders 9 depends upon the number of chokes 146, 145 and 144 in the valve device 12 which are effective to supply fluid under pressure from the reservoir 140 to the pipe 148, and as will be apparent from the above description, such amount or pressure will vary according to the speed at which the vehicle is operating. If the vehicle is operating above the high speed limit the supply of fluid under pressure for sanding will be by way of the three chokes so that the amount or pressure of fluid supplied to the sanders 9 for blowing sand to the sand pipes 92 will be relatively great. In case the vehicle is operating between the high and medium speed limits and only the chokes 144 and 145 are effective to supply fluid under pressure to pipe 148 to effect sanding, the amount or pressure of fluid will be less than when the vehicle is operating above the high speed limit, and the amount of sand blown from the rail sanders to the sand pipes 92 will also be correspondingly reduced. As the chokes 146, 145 and 144 are thus successively rendered ineffective upon reduction in the vehicle speed, the amount or pressure of fluid supplied to the sanding valve device 10 for supply to pipe 94 will be reduced accordingly and the amount of sand blown through the sand pipes 92 will likewise be reduced in proportion. In other words, the amount of sand supplied to the sand pipes 92 for sanding of the track rails depends upon and will vary in proportion to the amount or pressure of fluid supplied to the pipe 94, and since such amount or pressure of fluid depends upon the speed of the vehicle and is varied in proportion to different ranges of speed, as above described, the track rails will be sanded to substantially the most efficient degree for all speeds at which the vehicle may operate.

The fluid pressure supplied from the sanding reservoir 112 to piston chamber 103 in the sanding valve device 10 is gradually blown to the atmosphere through a choke 150 which may be provided in the pipe 115 and when this pressure is sufficiently reduced a spring 151 acting on the sanding valve 97 urges said valve to its seat and thus returns the valve 106 and piston 102 to their normal positions shown and in which the further supply of fluid under pressure from the pipe 148 to the sanding pipe 94 is cut off, thus terminating the sanding of the track rails. It will however be noted that the valve 106 is unseated before the valve 97 obtains its seat, so that momentarily during the closing movement of the valve 97 there will be a flow of fluid under pressure from bore 98 to the cleaning pipe 93. Thus at the termination of the sanding period a sudden, but limited flow of fluid under pressure, is provided through the cleaning pipe 93 to clean out the sanders 9 so that they will be in condition to operate subsequently, when desired.

The length of time during which sanding can be effected due to operation of the manually operated switch 13 is thus limited to the volume of sanding reservoir 112 with respect to the venting capacity of choke 150, but these parts are so designed as to insure sanding over a sufficient length of time to bring a vehicle to substantially a stop. At the end of the sanding period the manually operative switch 13 may be returned to its normal position. The magnet 107 is thereby deenergized permitting spring 117 to shift the double beat valve 110 back to the normal position shown and in which position the sanding reservoir 112 will be recharged with fluid under pressure from the supply pipe 17 so as to be in condition for further manual sanding whenever such is desired.

Manual sanding of the track rails as above described may be effected at any time the brakes on the vehicle are applied, regardless of whether the application is due to straight air operation of the brake valve device 1 or to automatic service operation of the brake valve device and of the brake controlling valve device 2 as will be apparent.

However, when the brake valve device 1 is operated to effect an emergency reduction in pressure in brake pipe 15 and the brake controlling valve device 2 responds to such reduction to effect an emergency application of the brakes on the vehicle, the sanding valve device 10 is operated automatically to effect sanding of the rails, as will now be described.

When an emergency application of the brakes on the vehicle is effected fluid under pressure supplied to the vent valve piston chamber 29 for actuating the vent valve piston 28 to unseat the vent valve 25 also flows from said chamber through pipe 118 to the double check valve device 116 wherein it acts to close communication between pipes 115 and 104 and to open communication between the latter and pipe 118. Fluid under pressure supplied to the pipe 118 then flows through pipe 104 to the sanding valve device 10 and operates said device in the same manner as hereinbefore described to supply fluid under pressure from pipe 148 to the sanders 9 for effecting sanding of the track rails.

The fluid pressure thus provided for operating the vent valve piston 28 and sanding valve device 10 gradually reduces to the atmosphere through choke 31 in the vent valve piston and the atmospheric passage 27 and when reduced sufficiently permits the spring 30 to close the vent valve 39 as hereinbefore described and also permits spring 151 to close valve 97 and thus terminate sanding. The parts are so designed that the valve 97 will not be closed as just described however until further sanding of the rails is not required, that is, until the vehicle is brought to a substantial stop. When the apparatus is operated to supply sand for sanding during an emergency application of the brakes it will be apparent that the valve device 12 will operate in the same manner as heretofore described to vary the amount or the pressure of fluid supplied for sanding according to the different speed ranges at which the vehicle operates to thereby insure most efficient braking but to prevent undue waste or loss of sand due to excessive use thereof.

In order that the supply of sand for sanding the track rails may be maintained until the vehicle is brought to a substantial stop as above described, it will be apparent that the contact 74 in the speed governor device 4 will not move into engagement with the fingers 77 to effect energization of the low speed magnet 65 and thus terminate sanding until the vehicle speed is reduced to a low degree, such as for instance from three to five miles per hour which is sufficiently low to insure prompt completion of the stop without further sanding of rails. This improved apparatus prevents the blowing of sand to the track rails when the vehicle is stopped and thus avoids waste of sand under such a condition, as will be apparent.

The speed limits at which the high and medium speed governor contacts 72 and 73 open the circuits controlled thereby may be whatever desired, such as for example sixty and thirty-five miles per hour, respectively.

It will be apparent that sanding of the rails either during a straight air brake application or during an automatic service brake application, due to manual operation of the switch 13, may be terminated by releasing said switch or with the arrangement just described may be maintained by holding the switch 13 closed until the vehicle is brought nearly to a stop.

With this improved sanding apparatus it will be noted that when a standing test of the brakes on a train is made, that is, a test with the train at rest before it leaves a terminal, no sand need be wasted, since neither the high nor medium speed magnets 53 and 59 will become energized under such a condition.

The check valve 141 is provided between the brake pipe and reservoir 140 to prevent the backflow of fluid under pressure from said reservoir to the brake pipe whenever the brake pipe pressure is reduced below that in said reservoir as in effecting an emergency application of the brakes. An adequate amount of fluid under pressure is thereby assured in the reservoir 140 for sanding purposes at all times and while any reduction in pressure in said reservoir will have some slight effect on the amount of fluid supplied through the valve device 12 to the sand pipe 148 for sanding, said reservoir will be sufficiently large to minimize this effect.

*Summary*

From the above description it will now be noted that the improved speed controlled sanding apparatus will provide sand for sanding purposes in amounts which are substantially proportional to different ranges in speed at which the vehicle will operate and which will thus provide substantially the same amount of sand on a certain unit length of track rail for all vehicle speeds. This arrangement will therefore insure efficient braking of the vehicle but at the same time will avoid undue use and waste of sand at the lower vehicle speeds; and prevent loss of sand when the vehicle is stopped.

It should be understood that the improved sanding apparatus is associated with the speed controlled relay valve device 3 for illustrative purposes only. The improved apparatus may be arranged to provide any desired number of different rates of said supply corresponding to any desired number of different selected ranges of speed within the speed limits of the vehicle.

While one illustrative embodiment of the invention has been described in detail it is not the intention to limit the scope to that embodiment or otherwise than by the terms of the appended claims.

Having now described my invention, what I claim as new and desire to secure by Letters Patent, is:

1. A sanding apparatus for sanding a rail under a railway vehicle, comprising, sander means for supplying sand for sanding said rail, regulating means for providing different rates of sand supply by said sander means, means adjustable in accordance with one or another of a plurality of different selected ranges of vehicle speed within the speed limits of the vehicle, mechanism conditionable substantially in accordance with the speed of the vehicle for controlling the adjustment of the adjustable means, and control means operative upon the different adjustments of the adjustable means for controlling said regulating means to provide a rate of sand supply by said sander means corresponding to each different speed range adjustment of said adjustable means.

2. A sanding apparatus for sanding a rail under a railway vehicle, comprising, sander means for supplying sand for sanding said rail, regulating means for providing different rates of sand supply by said sander means, means adjustable successively during deceleration of the vehicle to a series of different conditions corresponding to different selected ranges of speed of the vehicle, and means operative upon said series of successive adjustments to control said regulating means for providing a corresponding series of successively reduced rates of sand supply by said sander means, which rates are proportional to the speed range adjustments of the adjustable means.

3. A sanding apparatus for sanding a rail under a railway vehicle, comprising, sander means from which sand for sanding said rail is adapted to be blown by fluid under pressure at a rate proportional to the amount or pressure of said fluid, regulating means for varying the amount or pressure of fluid supplied to said sander means, and means adjustable successively during deceleration of the vehicle to a series of different conditions corresponding to different selected ranges of speed of the vehicle, said regulating means being controllable from the adjustable means and being operative upon each successive operation in said series of different conditions of said adjustable means to provide a correspondingly reduced amount or pressure of fluid supplied to said sander means.

4. A sanding apparatus for sanding a rail under a railway vehicle, comprising, sander means for supplying sand for sanding said rail, regulating means adjustable to provide one rate of sand supply by said sander means for one speed range of the vehicle, another rate of sand supply for another speed range of the vehicle and still another rate of sand supply for a third speed range of the vehicle, means conditionable for each of said different speed ranges to effect adjustment of said regulating means to limit the rate of sand supply according to the speed range, and means adjustable substantially in accordance with the speed of the vehicle for controlling the conditioning of said means.

5. A sanding apparatus for sanding a rail under a railway vehicle, comprising, sander means from which sand for sanding said rail is adapted to be blown by fluid under pressure at a rate proportional to the capacity of a communication to supply fluid under pressure thereto, regulating means adjustable to vary the flow capacity of said communication in proportion to different selected speed ranges of the vehicle within the speed limits thereof, and means controllable by the speed of the vehicle operative in each of said speed ranges to effect adjustment of said regulating means to provide the proper flow capacity through said communication for said speed range.

6. A sanding apparatus for sanding a rail under a railway vehicle, comprising, sander means from which sand for sanding said rail is adapted to be blown in a quantity which varies in accordance with the amount of fluid under pressure supplied thereto, regulating valve means adjustable to supply different selected amounts of fluid under pressure to said sander means corresponding to different selected speed ranges of the vehicle within the speed limits thereof, and means controlled by the speed of the vehicle and operative upon deceleration thereof to effect different adjustments of said regulating valve means to supply fluid under pressure to said sander means in the selected amount for each selected speed range.

7. A sanding apparatus for sanding a rail under a railway vehicle, comprising, sander means for supplying sand for sanding said rail, regulating means adjustable to provide different rates of sand supply by said sander means corresponding to different selected speed ranges of the vehicle within the speed limits thereof, control means having positions corresponding in number to said speed ranges and operative upon movement successively first to one and then to another of said positions to effect a series of successive adjustments of said regulating means to provide a corresponding number of different and successively reduced rates of sand supply by said sander means, and means conditionable in accordance with the speed of the vehicle upon deceleration thereof to position said control means in first one and then another of its positions corresponding to the speed range in which the vehicle is operating.

8. A sanding apparatus for sanding a rail under a railway vehicle, comprising, sander means for supplying sand for sanding said rail, regulating means for controlling the rate of sand supply by said sander means and comprising a plurality of valves operable together to provide one rate of sand supply, said regulating means being operable to provide a plurality of different rates of sand supply upon one or more of said valves being cut out of operation, and means for controlling said regulating means and adjustable substantially in accordance with the speed of the vehicle to render either all of said valves effective to control the rate of sand supply or to cut one or more of said valves out of operation for thereby proportioning the rate of sand supply substantially to the speed of the vehicle within different speed ranges thereof.

9. A sanding apparatus for sanding a rail under a railway vehicle comprising sander means for supplying sand for sanding said rail, regulating means for controlling the rate of sand supply by said sander means and comprising a plurality of valves operable together to provide a chosen maximum rate of sand supply, said regulating means being operable to provide a series of successively slower rates of sand supply upon cutting first one and then another of said valves out of operation, and means conditionable in accordance with the speed of the vehicle for rendering all of said valves effective above a certain high speed limit of the vehicle and operative upon deceleration of the vehicle to successively cut first one and then another of said valves out of operation at chosen reduced speeds of the vehicle.

10. A sanding apparatus for sanding a rail under a railway vehicle, comprising, sander means from which sand for sanding said rail is adapted to be blown by fluid under pressure at a rate dependent upon the pressure of said fluid, a plurality of valves for independently supplying fluid under pressure to said sander means for blowing sand therefrom, the pressure of said fluid obtained at said sander means varying in proportion to the number of said valves which are operative to supply fluid under pressure thereto, and means for controlling said valves and operable either to render all of said valves effective to supply fluid under pressure to said sander means or to successively render first one and then another of said valves ineffective to supply fluid under pressure to said sander means.

11. A sanding apparatus for sanding a rail under a railway vehicle, comprising, sander means from which sand for sanding said rail is adapted to be blown by fluid under pressure at a rate dependent upon the pressure of said fluid, a plurality of valves for independently supplying fluid under pressure to said sander means for blowing sand therefrom, the pressure of said fluid obtained at said sander means varying in proportion to the number of said valves which are operative to supply fluid under pressure thereto, and means conditionable in accordance with the speed of the vehicle for controlling said valves and operable to render all of said valves operable at a certain high speed limit of the vehicle and for rendering one of said valves inoperative at a certain lower speed, another of said valves inoperative at a still lower speed, and for rendering still another of said valves inoperative at a still lower speed of the vehicle.

12. A sanding apparatus for sanding a rail under a railway vehicle, comprising, sanding means operable to supply sand at various rates for sanding said rail, means having a plurality of chambers corresponding to different selected speed limits of the vehicle within the speed range thereof, valve means operable upon a variation in fluid pressure in one or more of said chambers for varying the rate of sand supply by said sander means in proportion to the number of said chambers in which said variation in fluid pressure is effected, control means for effecting said variation of fluid pressure in one or more of said chambers, and means conditionable substantially in accordance with the speed of the vehicle for selectively connecting one or more of said chambers to said control means for rendering said control means effective to effect a variation in fluid pressure therein.

13. A sanding apparatus for sanding a rail under a railway vehicle comprising, sander means operable to supply sand at various rates for sanding said rail, means having a plurality of chambers corresponding to different speed ranges of the vehicle within the speed limits thereof and to which chambers fluid under pressure is adapted to be supplied and released, means operable when the pressure of fluid in one or more of said chambers exceeds a certain degree to regulate the rate at which sand is supplied by said sander means in proportion to the number of said chambers in which the pressure of fluid exceeds said certain degree, said means being operable upon the release of fluid under pressure from one or more of said chambers to effect a proportionate reduction in the rate of sand supply by said sander means, means operable to provide fluid under pressure for supply to all of said chambers, and means conditionable substantially in accordance with the speed of the vehicle for controlling communication through which fluid under pressure is adapted to be supplied to and released from said chambers and operative in accordance with different speed limits of the vehicle to condition said communication so as to vary the rate of sand supply in proportion to the vehicle speed at said speed limits.

14. In combination, means having a plurality of chambers corresponding to different speed limits at which a vehicle is adapted to operate within its range of speed and being operable by fluid under pressure acting in one or another of said chambers to effect various degrees of brake application on the vehicle according to which chamber is effective, control means operative to provide fluid under pressure for supply to said chambers for operating said means, means conditionable substantially in accordance with the speed of the vehicle for selectively connecting the chamber corresponding to the operating speed of the vehicle to said control means, and sanding means conditioned, in accordance with which of said chambers is effective, to operate during an application of the brakes on the vehicle to effect a supply of sand at a rate proportional to the respective speed limit.

15. In combination, means having a plurality of chambers corresponding in number to different selected speed limits within the speed range of the vehicle and being operable upon the supply of fluid under pressure to all of said chambers to effect a maximum degree of brake application on the vehicle and upon subsequent venting of fluid under pressure first from one and then another of said chambers to effect a reduction in the degree of brake application for each chamber thus vented, means for supplying fluid under pressure to all of said chambers, means conditionable substantially in accordance with the speed of the vehicle and operative upon deceleration thereof during braking to effect at said different selected speed limits the venting of first one and then another of said chambers, sand control means operable to provide for a supply of sand at different rates for sanding a rail under the vehicle, and means operable upon the supply of fluid under pressure to all of said chambers to effect operation of said sand control means to provide for a maximum rate of sand supply and upon the subsequent venting of first one and then another of said chambers to effect adjustment of said sand control means to provide for the supply of sand at a reduced rate which is in proportion to the reduced speed of the vehicle.

16. In combination, sander means from which sand for sanding a rail under a vehicle is adapted to be blown by fluid under pressure at a rate dependent upon the pressure of said fluid, means operable by the force of fluid under pressure to effect an application of the brakes on the vehicle, control means conditionable substantially in accordance with different selected speeds of the vehicle for limiting said force to a degree which is proportional to the selected speed, and means operable in accordance with variations in the degree of said force to supply fluid to said sander means at a pressure in proportion to the degree of said force and thus in accordance with the selected speed of the vehicle.

17. In combination, sander means from which sand for sanding a rail under a vehicle is adapted to be blown by fluid under pressure at a rate which varies according to the pressure of fluid supplied to said sander means, valve means operable to supply fluid under pressure to a chamber, means for controlling said valve means and conditionable in accordance with the speed of the vehicle to effect operation of said valve means to supply fluid to said chamber at a rate which is dependent upon and in proportion to the speed of the vehicle, brake controlling means operative to effect an application of the brakes on the vehicle, and means operable upon operation of said brake controlling means to open communication between said chamber and sander means through which fluid at the pressure supplied to said chamber is adapted to flow to said sander means for blowing sand therefrom.

ELLIS E. HEWITT.